US008194827B2

(12) United States Patent
Jaiswal et al.

(10) Patent No.: US 8,194,827 B2
(45) Date of Patent: Jun. 5, 2012

(54) SECURE VOICE TRANSACTION METHOD AND SYSTEM

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 12/111,301

(22) Filed: Apr. 29, 2008

(65) Prior Publication Data

US 2009/0323906 A1 Dec. 31, 2009

(51) Int. Cl.
*H04M 1/64* (2006.01)
(52) U.S. Cl. ............... 379/88.02; 379/126; 704/250; 704/270; 455/410
(58) Field of Classification Search .... 379/88.01–88.02, 379/126; 704/270, 250; 455/410
See application file for complete search history.

(56) References Cited

U.S. PATENT DOCUMENTS

| | | | |
|---|---|---|---|
| 4,837,422 A | 6/1989 | Dethloff et al. | |
| 5,721,583 A | 2/1998 | Harada et al. | |
| 5,845,260 A | 12/1998 | Nakano et al. | |
| 6,078,807 A * | 6/2000 | Dunn et al. | 455/410 |
| 6,389,397 B1 * | 5/2002 | Otto | 704/270 |
| 7,212,613 B2 * | 5/2007 | Kim et al. | 379/88.02 |
| 7,248,678 B2 * | 7/2007 | Adams et al. | 379/126 |
| 2006/0085189 A1 * | 4/2006 | Dalrymple et al. | 704/250 |

OTHER PUBLICATIONS

"*Ex parte Catan*" 83 USPQ2d, pp. 1569-1577.

* cited by examiner

*Primary Examiner* — Fan Tsang
*Assistant Examiner* — Van D Huynh
(74) *Attorney, Agent, or Firm* — Schmeiser, Olsen & Watts; John R. Pivnichny

(57) ABSTRACT

A security method and system. The method includes receiving by a computing system, a telephone call from a user. The computing system comprises an existing password/passphrase and a pre-recorded voice sample associated with the user. The computing system prompts the user to enter a password/passphrase using speech. The computing system receives speech data comprising a first password/passphrase from the user. The computing system converts the speech data to text data. The computing system first compares the text data to the first password/passphrase and determines a match. The computing system compares the speech data to the pre-recorded voice sample to determine a result indicating whether a frequency spectrum associated with the speech data matches a frequency spectrum associated with the pre-recorded voice sample. The computing system transmits the result to the user.

22 Claims, 4 Drawing Sheets

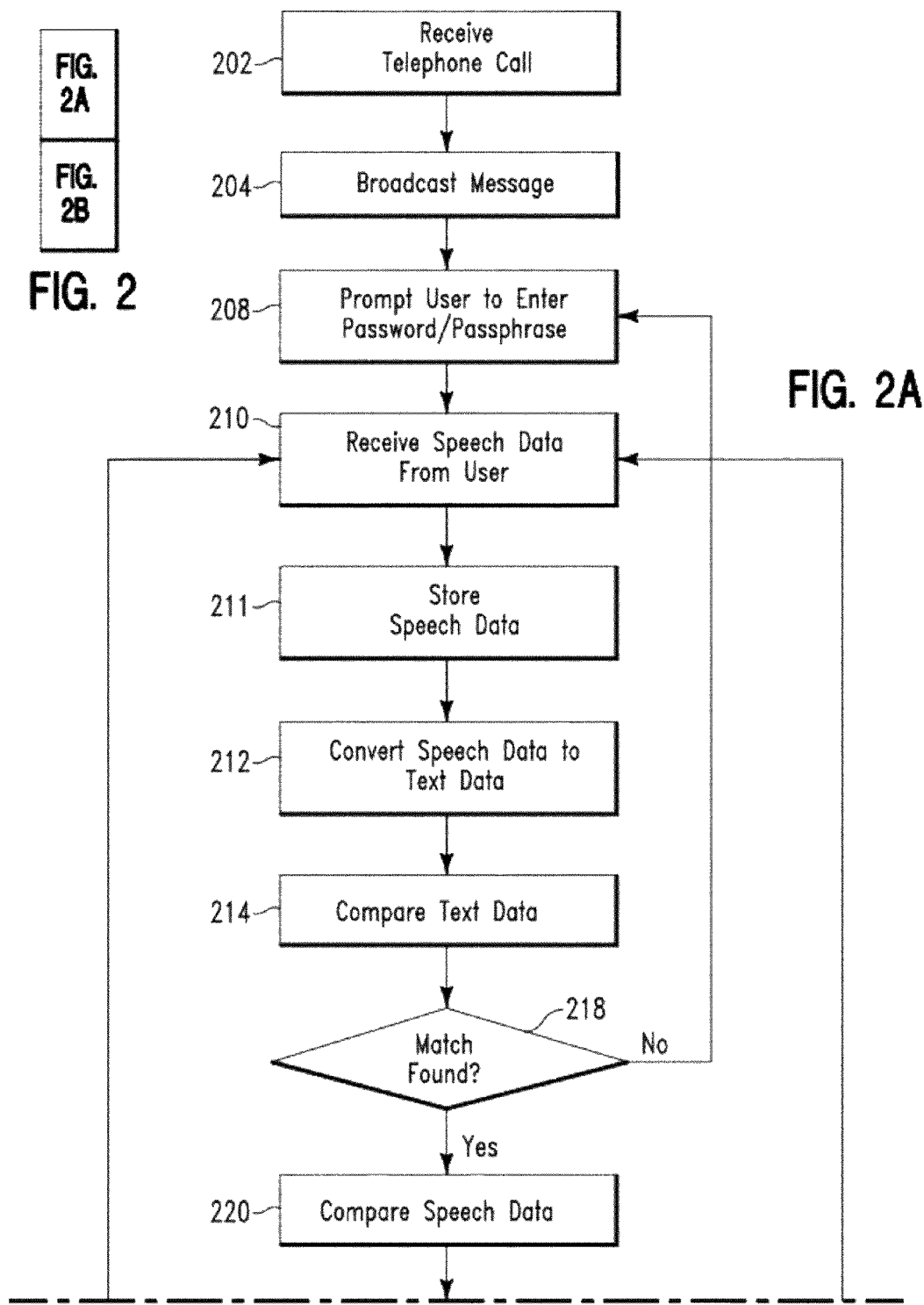

SECURE VOICE TRANSACTION METHOD AND SYSTEM

FIELD OF THE INVENTION

The present invention relates to a method and associated system for providing secure voice transactions.

BACKGROUND OF THE INVENTION

Providing secure communications between parties typically comprises an inefficient process with little flexibility. Accordingly, there exists a need in the art to overcome at least some of the deficiencies and limitations described herein above.

SUMMARY OF THE INVENTION

The present invention provides a security method comprising:

receiving, by a computing system, a first telephone call from a first user, wherein said computing system comprises a memory system, wherein said memory system comprises first existing text data associated with said first user and a first pre-recorded voice sample associated with said first user, and wherein said first existing text data comprises a first existing password/passphrase;

broadcasting, by said computing system, an indication message for said first user, wherein said indication message indicates an entity associated with said computing system;

first prompting, by said computing system, said first user to enter a password/passphrase using speech;

receiving, by said computing system from said first user in response to said first prompting, first speech data comprising a first password/passphrase associated with said first user;

storing, by said computing system, said first speech data;

converting, by said computing system, said first speech data to first text data;

after said converting, comparing by said computing system, said first text data to said first existing text data to determine if said first password/passphrase matches said first existing password/passphrase, wherein said comparing said first text data to said first existing text data determines that said first password/passphrase matches said first existing password/passphrase;

comparing, by said computing system, said first speech data to said first pre-recorded voice sample to determine if a frequency spectrum associated with said first speech data matches a frequency spectrum associated with said first pre-recorded voice sample;

generating, by said computing system based on results of said comparing said first speech data to said first pre-recorded voice sample, a first message indicating said results; and transmitting, by said computing system to said first user, said first message.

The present invention provides a computing system comprising a processor coupled to a computer-readable memory unit, said memory unit comprising a resource server software application and instructions that when executed by the processor implements a security method, said method comprising:

receiving, by said computing system, a first telephone call from a first user, wherein said computing system comprises a memory system, wherein said memory system comprises first existing text data associated with said first user and a first pre-recorded voice sample associated with said first user, and wherein said first existing text data comprises a first existing password/passphrase;

broadcasting, by said computing system, an indication message for said first user, wherein said indication message indicates an entity associated with said computing system;

first prompting, by said computing system, said first user to enter a password/passphrase using speech;

receiving, by said computing system from said first user in response to said first prompting, first speech data comprising a first password/passphrase associated with said first user;

storing, by said computing system, said first speech data;

converting, by said computing system, said first speech data to first text data;

after said converting, comparing by said computing system, said first text data to said first existing text data to determine if said first password/passphrase matches said first existing password/passphrase, wherein said comparing said first text data to said first existing text data determines that said first password/passphrase matches said first existing password/passphrase;

comparing, by said computing system, said first speech data to said first pre-recorded voice sample to determine if a frequency spectrum associated with said first speech data matches a frequency spectrum associated with said first pre-recorded voice sample;

generating, by said computing system based on results of said comparing said first speech data to said first pre-recorded voice sample, a first message indicating said results; and transmitting, by said computing system to said first user, said first message.

The present invention advantageously provides a simple method and associated system capable of providing secure communications between parties.

BRIEF DESCRIPTION OF THE DRAWINGS

FIG. 2 which includes FIGS. 2A and 2B illustrates a flowchart describing an algorithm used by the system of FIG. 1 for providing secure voice transactions, in accordance with embodiments of the present invention.

DETAILED DESCRIPTION OF THE INVENTION

Figure 1:
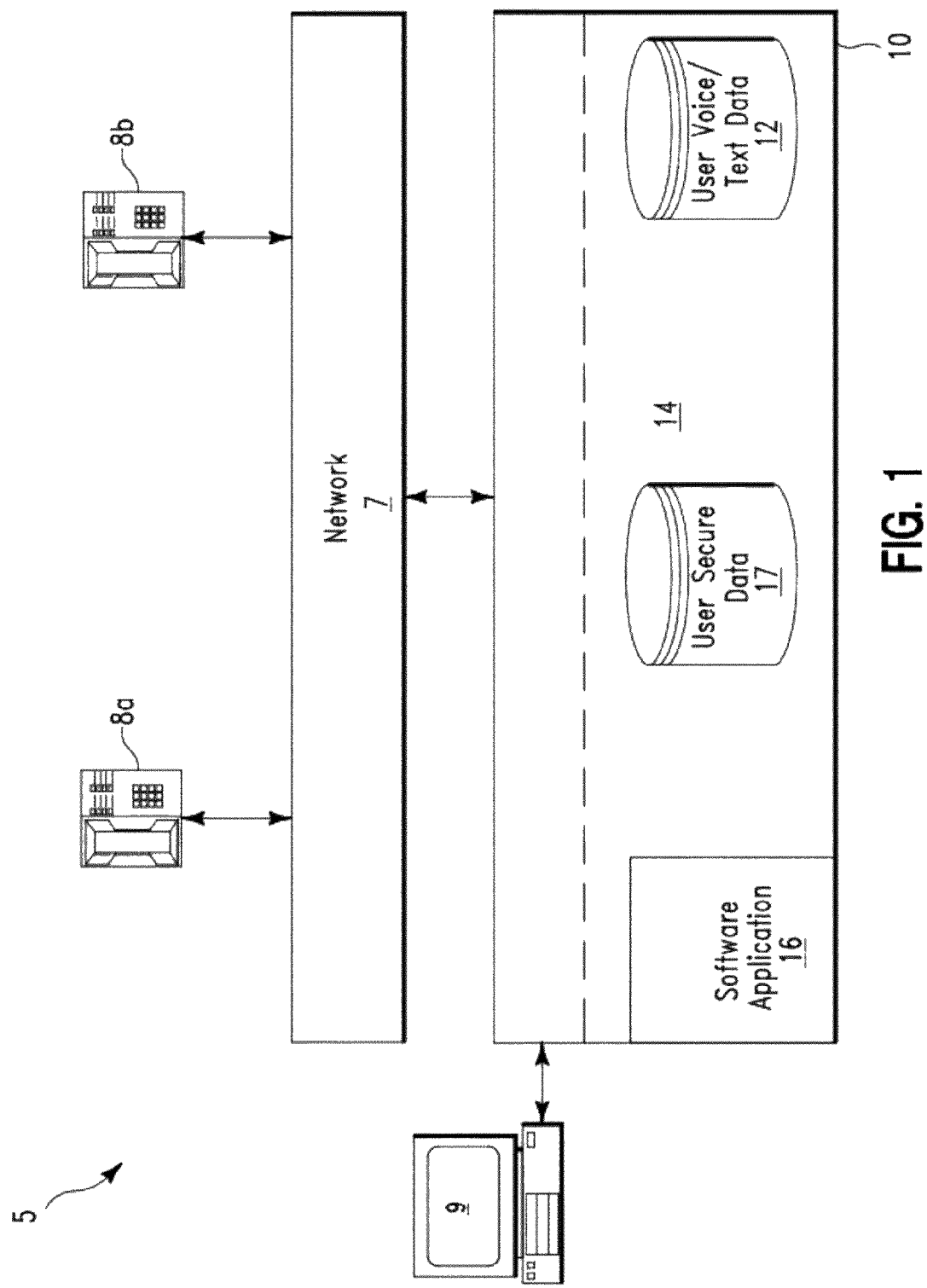
FIG. 1 illustrates a system for providing secure voice transactions, in accordance with embodiments of the present invention.

FIG. 1 illustrates a system 5 for providing secure voice transactions, in accordance with embodiments of the present invention. System 5 performs an authentication process using a combination of a speech recognition process and a biometric identification process.

The speech recognition process comprises prompting a user to enter secure information (e.g., a password/passphrase, an identification ID) via speech. The speech data (e.g., password/passphrase) is stored (as is) converted to text data via a speech recognition process. A speech recognition process converts spoken words into a machine readable input representing a content of the spoken words (e.g., a binary code). The text data is passed over to a business logic module that identifies and authenticates the user. If the user is authenticated, the process passes onto the biometric identification process.

The biometric identification process comprises storing a voice print (sample) for a user so that when the user requests authentication, the stored voice print is compared to the users voice (i.e., the incoming speech data) to determine a match. If a match is found, the user is authenticated and allowed access into the system.

System 5 of FIG. 1 comprises a telephone 8a and a telephone 8b connected to a computing system 10 through a network 7. Additionally, system 5 comprises a computing apparatus 9 connected to computing system 10. Computing apparatus 9 may be used by an administrator to access and perform maintenance on computing system. Additionally, computing apparatus 9 may be used by an administrator to perform an extra level of authentication for a user. Computing apparatus 9 may comprise, inter alia, a personal computer, a laptop computer, a computer terminal, etc. Computing apparatus 9 may comprise a single computing apparatus or a plurality of computing apparatuses. Telephone 8a and telephone 8b may comprise any type of telephone including, inter alia, a wired telephone, a cordless telephone, a cellular telephone, etc. Telephone 8a and telephone 8b may be connected to computing system 10 through a standard telephone network (i.e., network 7 is a telephone network). Alternatively, telephone 8a and telephone 8b may be connected to network 7 (and computing system 10) through a computer (e.g., using voice over IP). Telephone 8a and telephone 8b are used by users for authentication and accessing secure information. Network 7 may comprise any type of network including, inter alia, a local area network, (LAN), a wide area network (WAN), the Internet, a telephone network, etc. Computing system 10 may comprise any type of computing system(s) including, inter alia, a personal computer (PC), a server computer, a database computer, etc. Computing system 10 comprises a memory system 14. Memory system 14 may comprise a single memory system. Alternatively, memory system 14 may comprise a plurality of memory systems. Memory system 14 comprises a software application 18, a user text/voice data repository 12, and a user secure data repository 17. User text/voice data repository 12 may comprise a database. User secure data repository 17 may comprise a database. User text/voice data repository 12 and user secure data repository 17 may each comprise a single storage device or a plurality of storage devices. User text/voice data repository 12 comprises user speech (voice) data (e.g., a user pre-recorded voice sample) and user text data (e.g., a password/passphrase spoken by the user and converted to text using a speech recognition process). User secure data repository 17 comprises secure information associated with the user. The secure information is accessible by the user after he/she is validated via the speech recognition process and the biometric identification process. The secure information is may be accessible by the user via an automated system (i.e., direct access) or through a live operator. The secure information may comprise any type of secure information including, inter alia, bank account information, credit card information, retirement account information, insurance information, etc.

Software application 18 may comprise a speech recognition module and a voice print (biometrics) authentication module. The speech recognition module converts user speech data (e.g., password/passphrase) into text data. The voice print authentication module compares a stored voice print (i.e., for a user) to the users voice (i.e., the incoming speech data) to determine a match or a partial match. Software application 16 performs the following steps with respect to an implementation example for providing secure voice transactions:

1. A user places a telephone call (i.e., via telephone 8a or 8b) using a toll free number provided by a retail institution (e.g., a bank or a credit card agency).
2. The telephone call passes through a public telephone network (e.g., network 7) and ultimately arrives at computing system 10.
3. Computing system 10 broadcasts a welcome message (e.g., Thank you for calling ABC bank).
4. Computing system 10 prompts the user to speak a secret pass phrase (e.g., the caller says "A noise burst can destroy a frame").
5. The user says the secret pass phrase.
6. The secret pass phrase (i.e., speech data) is received by software application 16 (i.e., comprising a speech recognition module and a voice print (biometrics) authentication module).
7. The speech recognition module analyzes the text from the speech data spoken by the user to determine if the secret pass phrase matches a stored pass phrase.
   A. If the secret pass phrase matches the stored pass phrase, the speech recognition module flags the analysis as a success and notifies software application 16.
   B. If the secret pass phrase does not match the stored pass phrase (i.e., the phrase spoken was not the pass phrase), the speech recognition module flags the analysis as an error and notifies the software application 16. Software application 16 may then play back a message to the user asking them to repeat the pass phrase or take any further action as dictated by business rules.
8. The voice print (biometrics) authentication module analyzes the text from the speech data spoken by the user to determine if aural (i.e., audible) characteristics from the speech data match aural characteristics of a pre-established aural sample of the user.
   A. If the aural (i.e., audible) characteristics from the speech data match the aural characteristics of a pre-established aural sample of the user, the voice print (biometrics) authentication module flags the analysis as a success and notifies software application 16.
   B. If the aural (i.e., audible) characteristics from the speech data do not match the aural characteristics of a pre-established aural sample of the user, the voice print (biometrics) authentication module flags the analysis as an error and notifies software application 16. Additionally, the voice print (biometrics) authentication module may submit reasons for the error. For example, the spoken sample (i.e., the speech data) may not have a same frequency spectrum as the pre-established aural sample due to voice characteristics such as, inter alia, aging, sickness of the user, etc. In these cases, software application may request that the user submit further identification or re-sample the pass phrase.
9. Software application obtains both success flags (i.e., from the speech recognition module and the voice print (biometrics) authentication module) and logs the user into the computing system.
10. The user may then continue the actual intent of the telephone call (e.g., access secure data in user secure data repository 17, talk to an agent, etc).

Figure 2B:
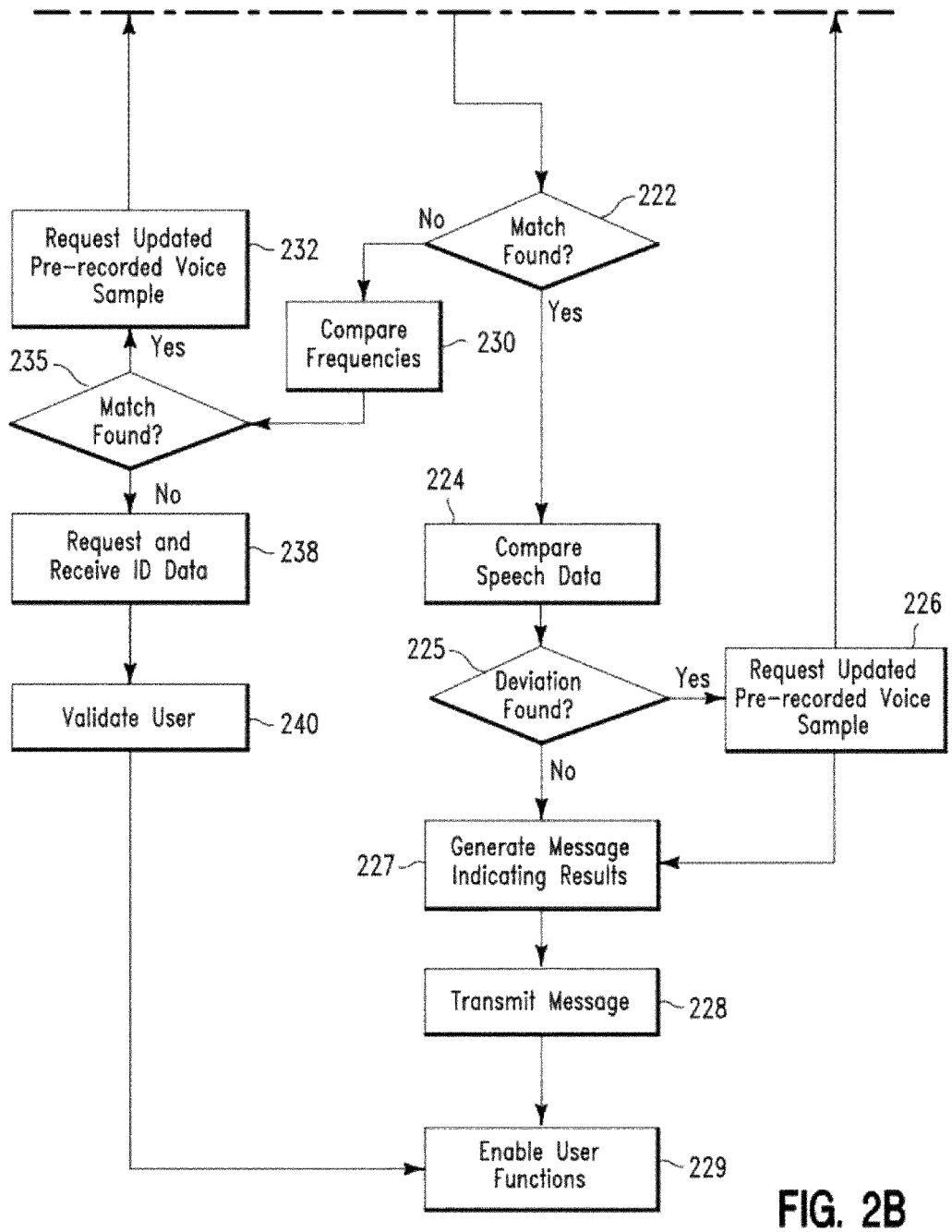

FIG. 2 which includes FIGS. 2A and 2B illustrates a flowchart describing an algorithm used by system 5 of FIG. 1 for providing secure voice transactions, in accordance with embodiments of the present invention. In step 202, a computing system (e.g., computing system 10 of FIG. 1) receives a telephone call from a user. The computing system comprises (i.e., stored in a memory system) existing text data associated with the user and a pre-recorded voice sample associated with the user. The existing text data comprises an existing password/passphrase. In step 204, the computing system broadcasts a message indicating an entity (e.g., a company such as a bank) associated with the computing system and the user. In step 208, computing system prompts the user to enter (i.e., via speech) a password/passphrase. In step 210, the computing system receives (i.e., from the user in response to step 208) speech data comprising a user password/passphrase associated with the first user. In step 211, the computing system stores the speech data. In step 212, the computing system converts the speech data to text data. In step 214, the computing system compares the text data to the existing text data (i.e., stored in the computing system). In step 218, it is determined (i.e., based on comparing the text data to the existing text data from step 214) if the user password/passphrase matches the existing password/passphrase. If in step 218, it is determined (i.e., based on comparing the text data to the existing text data from step 214) that the user password/passphrase does not match the existing password/passphrase then step 208 is repeated so that the user may be prompted to re-enter a password/passphrase. If in step 218, it is determined (i.e., based on comparing the text data to the existing text data from step 214) that the user password/passphrase does match the existing password/passphrase then in step 220, the computing system compares the speech data to the pre-recorded voice sample. In step 222, it is determined (i.e., based on comparing the speech data to the pre-recorded voice sample) if a first frequency spectrum associated with the speech data matches a second frequency spectrum associated with the pre-recorded voice sample.

If in step 222, it is determined (i.e., based on comparing the speech data to the pre-recorded voice sample) that the first frequency spectrum associated with the speech data matches the second frequency spectrum associated with the pre-recorded voice sample then in step 224, the computing system again compares the speech data to the pre-recorded voice sample. In step 225, it is determined (i.e., based on comparing the speech data to the pre-recorded voice sample) if a predetermined frequency deviation is found between the first frequency spectrum and the second frequency spectrum. The frequency deviation comprises a predetermined frequency difference (e.g., a maximum determined difference) between the first frequency spectrum and the second frequency spectrum. If in step 225, it is determined (i.e., based on comparing the speech data to the pre-recorded voice sample in step 224) that a predetermined frequency deviation is found between the first frequency spectrum and the second frequency spectrum then in step 226, the computing system requests that the user enter an updated pre-recorded voice sample and step 210 is repeated. Additionally in step 227, the computing system generates a message indicating results of steps 222 and 225. In step 228, the message is transmitted to the user. In step 229, user functions (e.g., access secure data, talk to an agent, etc) are enabled.

If in step 225, it is determined (i.e., based on comparing the speech data to the pre-recorded voice sample in step 224) that a predetermined frequency deviation is not found between the first frequency spectrum and the second frequency spectrum then in step 227, the computing system generates a message indicating results of steps 222 and 225. In step 228, the message is transmitted to the user. In step 229, user functions (e.g., access secure data, talk to an agent, etc) are enabled.

If in step 222, it is determined (i.e., based on comparing the speech data to the pre-recorded voice sample) that the first frequency spectrum associated with the speech data does not match the second frequency spectrum associated with the pre-recorded voice sample then in step 230, the computing system compares a first frequency of the first frequency spectrum to a second frequency of the second frequency spectrum. In step 235 it is determined (i.e., based on step 230) if the first frequency matches the second frequency.

If in step 235, it is determined (i.e., based on step 230) that the first frequency matches the second frequency then in step 232, the computing system requests that the user enter an updated pre-recorded voice sample and step 210 is repeated.

If in step 235, it is determined (i.e., based on step 230) that the first frequency does not match the second frequency then in step 238 then, the computing system may request that the user enter a user ID or password. Alternatively, an administrator of computing system may speak directly with the user in order to identify the user. In step 240 the computing system and/or the administrator validates or authenticates the user and step 228 executed as described, supra.

Figure 3:
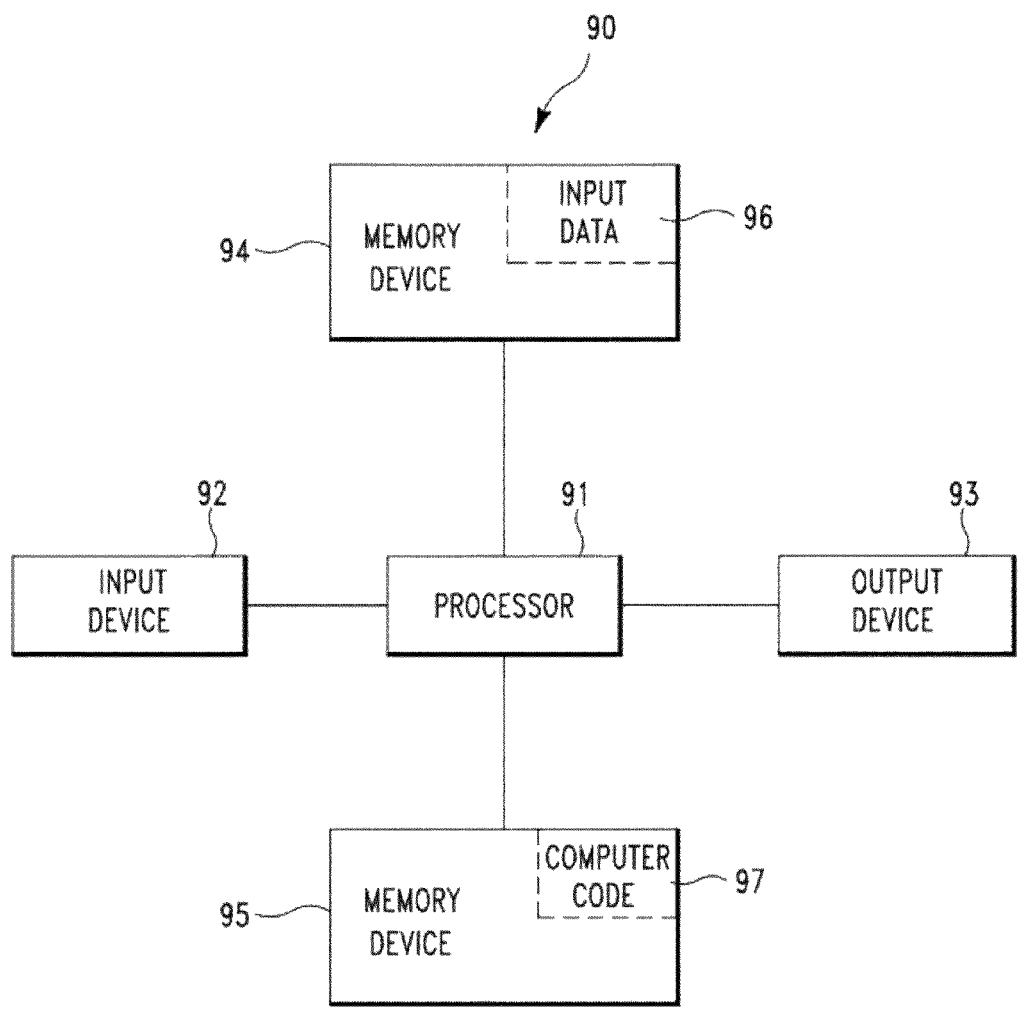
FIG. 3 illustrates a computer apparatus used for providing secure voice transactions, in accordance with embodiments of the present invention.

FIG. 3 illustrates a computer apparatus 90 (e.g., computing system 10 of FIG. 1) used for providing secure voice transactions, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for providing secure voice transactions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to provide secure voice transactions. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for providing secure voice transactions. In another embodiment, the invention provides a business method that performs the process steps of the invention on a subscription, advertising, and/or fee basis. That is, a service provider, such as a Solution Integrator, could offer to provide secure voice transactions. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A security method comprising:
    receiving, by a computing system, a first telephone call from a first user, wherein said computing system comprises a memory system, wherein said memory system comprises first existing text data associated with said first user and a first pre-recorded voice sample associated with said first user, and wherein said first existing text data comprises a first existing password/passphrase;
    broadcasting, by said computing system, an indication message for said first user, wherein said indication message indicates an entity associated with said computing system;
    first prompting, by said computing system, said first user to enter a password/passphrase using speech;
    receiving, by said computing system from said first user in response to said first prompting, first speech data comprising a first password/passphrase associated with said first user;
    storing, by said computing system, said first speech data;
    converting, by said computing system, said first speech data to first text data;
    after said converting, comparing by said computing system, said first text data to said first existing text data to determine if said first password/passphrase matches said first existing password/passphrase, wherein said comparing said first text data to said first existing text data determines that said first password/passphrase matches said first existing password/passphrase;
    comparing, by said computing system, said first speech data to said first pre-recorded voice sample to determine if a frequency spectrum associated with said first speech data matches a frequency spectrum associated with said first pre-recorded voice sample;
    additionally comparing, by said computing system, a first frequency of said frequency spectrum associated with said first speech data to a second frequency of said frequency spectrum associated with said first pre-recorded voice sample to determine if said first frequency matches said second frequency, and wherein said second frequency represents a minimum frequency as compared to all other frequencies of said frequency spectrum associated with said first pre-recorded voice sample;
    generating, by said computing system based on results of said comparing and said additionally comparing, a first message indicating said results; and
    transmitting, by said computing system to said first user, said first message.

2. The method of claim 1, wherein said comparing said first speech data to said first pre-recorded voice sample determines that said frequency spectrum associated with said first speech data matches said frequency spectrum associated with said first pre-recorded voice sample, and wherein said method further comprises:
    enabling, by said computing system, said first user to perform a function associated with said first telephone call.

3. The method of claim 2, wherein said function comprises speaking with a person associated with said entity.

4. The method of claim 2, wherein said function comprises accessing a secure account associated with said first user.

5. The method of claim 1, wherein said comparing said first speech data to said first pre-recorded voice sample determines that said frequency spectrum associated with said first speech data does not match said frequency spectrum associated with said first pre-recorded voice sample, and wherein said method further comprises:
    generating, by said computing system based on said results, an error message; and
    transmitting, by said computing system, said error message to said first user.

6. The method of claim 5, further comprising:
    after said transmitting said error message, second prompting by said computing system, said first user to submit identification data associated with said first user;
    receiving, by said computing system from said first user in response to said second prompting, first identification data;
    validating, by said computing system, said first user; and
    enabling, by said computing system, said first user to perform a function associated with said first telephone call.

7. The method of claim 1, further comprising:
    receiving, by a computing system, a second telephone call from a second user, wherein said memory system comprises second existing text data associated with said second user and a second pre-recorded voice sample associated with said second user, and wherein said second existing text data comprises a second existing password/passphrase;
    broadcasting, by said computing system, said indication message for said second user;
    second prompting, by said computing system, said second user to enter a password/passphrase using speech;
    receiving, by said computing system from said second user in response to said second prompting, second speech data comprising a second password/passphrase associated with said second user;
    storing, by said computing system, said second speech data;
    converting, by said computing system, said second speech data to second text data;
    comparing, by said computing system, said second text data to said second existing text data to determine if said second password/passphrase matches said second existing password/passphrase, wherein said comparing said second text data to said second existing text data determines that said second password/passphrase does not match said second existing password/passphrase;
    generating, by said computing system in response to said comparing said second text data to said second existing text data, an error message; and
    transmitting, by said computing system, said error message to said second user.

8. The method of claim 7, further comprising:
    after said transmitting said error message to said second user, requesting by said computing system, that said second user re-enter a password/passphrase using speech;

receiving, by said computing system from said second user in response to said requesting, third speech data comprising a third password/passphrase associated with said second user;

storing, by said computing system, said third speech data;

converting, by said computing system, said third speech data to third text data;

comparing, by said computing system, said third text data to said second existing text data to determine if said third password/passphrase matches said second existing password/passphrase, wherein said comparing said third text data to said second existing text data determines that said third password/passphrase matches said second existing password/passphrase;

comparing, by said computing system, said third speech data with said second pre-recorded voice sample to determine if a frequency spectrum associated with said third speech data matches a frequency spectrum associated with said second pre-recorded voice sample;

generating, by said computing system based on second results of said comparing said third speech data to said second pre-recorded voice sample, a second message indicating said second results; and transmitting, by said computing system to said second user, said second message.

9. The method of claim 1, wherein said comparing said first speech data to said first pre-recorded voice sample determines that said frequency spectrum associated with said first speech data does not match said frequency spectrum associated with said first pre-recorded voice sample, wherein said additionally comparing said first frequency to said second frequency determines that said first frequency matches said second frequency, and wherein said method further comprises:

after said additionally comparing said first frequency to said second frequency, generating by said computing system, a second message requesting that said first user submit an updated pre-recorded voice sample; and transmitting, by said computing system to said first user, said second message.

10. The method of claim 1, wherein said comparing said first speech data to said first pre-recorded voice sample determines that said frequency spectrum associated with said first speech data does match said frequency spectrum associated with said first pre-recorded voice sample, and wherein said method further comprises:

second comparing, by said computing system, said first speech data to said first pre-recorded voice sample to determine if a predetermined frequency deviation is found between said frequency spectrum associated with said first speech data and said frequency spectrum associated with said first pre-recorded voice sample, wherein said second comparing determines that said predetermined frequency deviation is found between said frequency spectrum associated with said first speech data and said frequency spectrum associated with said first pre-recorded voice sample;

after said second comparing, generating by said computing system, a second message requesting that said first user submit an updated pre-recorded voice sample; and transmitting, by said computing system to said first user, said second message.

11. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

12. A computer program product, comprising a computer readable storage device storing a computer readable program code, said computer readable program code configured to perform the method of claim 1 upon being executed by a processor of a computing system.

13. A computing system comprising a processor coupled to a computer-readable memory unit, said memory unit comprising a resource server software application and instructions that when executed by the processor implements a security method, said method comprising:

receiving, by said computing system, a first telephone call from a first user, wherein said computing system comprises a memory system, wherein said memory system comprises first existing text data associated with said first user and a first pre-recorded voice sample associated with said first user, and wherein said first existing text data comprises a first existing password/passphrase;

broadcasting, by said computing system, an indication message for said first user, wherein said indication message indicates an entity associated with said computing system;

first prompting, by said computing system, said first user to enter a password/passphrase using speech;

receiving, by said computing system from said first user in response to said first prompting, first speech data comprising a first password/passphrase associated with said first user;

storing, by said computing system, said first speech data;

converting, by said computing system, said first speech data to first text data;

after said converting, comparing by said computing system, said first text data to said first existing text data to determine if said first password/passphrase matches said first existing password/passphrase, wherein said comparing said first text data to said first existing text data determines that said first password/passphrase matches said first existing password/passphrase;

comparing, by said computing system, said first speech data to said first pre-recorded voice sample to determine if a frequency spectrum associated with said first speech data matches a frequency spectrum associated with said first pre-recorded voice sample;

additionally comparing, by said computing system, a first frequency of said frequency spectrum associated with said first speech data to a second frequency of said frequency spectrum associated with said first pre-recorded voice sample to determine if said first frequency matches said second frequency, and wherein said second frequency represents a minimum frequency as compared to all other frequencies of said frequency spectrum associated with said first pre-recorded voice sample;

generating, by said computing system based on results of said comparing and said additionally comparing, a first message indicating said results; and transmitting, by said computing system to said first user, said first message.

14. The computing system of claim 13, wherein said comparing said first speech data to said first pre-recorded voice sample determines that said frequency spectrum associated with said first speech data matches said frequency spectrum associated with said first pre-recorded voice sample, and wherein said method further comprises:

enabling, by said computing system, said first user to perform a function associated with said first telephone call.

15. The computing system of claim 14, wherein said function comprises speaking with a person associated with said entity.

16. The computing system of claim 14, wherein said function comprises accessing a secure account associated with said first user.

17. The computing system of claim 13, wherein said comparing said first speech data to said first pre-recorded voice sample determines that said frequency spectrum associated with said first speech data does not match said frequency spectrum associated with said first pre-recorded voice sample, and wherein said method further comprises:
generating, by said computing system based on said results, an error message; and
transmitting, by said computing system, said error message to said first user.

18. The computing system of claim 13, wherein said method further comprises:
after said transmitting said error message, second prompting by said computing system, said first user to submit identification data associated with said first user;
receiving, by said computing system from said first user in response to said second prompting, first identification data;
validating, by said computing system, said first user; and
enabling, by said computing system, said first user to perform a function associated with said first telephone call.

19. The computing system of claim 13, wherein said method further comprises:
receiving, by a computing system, a second telephone call from a second user, wherein said memory system comprises second existing text data associated with said second user and a second pre-recorded voice sample associated with said second user, and wherein said second existing text data comprises a second existing password/passphrase;
broadcasting, by said computing system, said indication message for said second user;
second prompting, by said computing system, said second user to enter a password/passphrase using speech;
receiving, by said computing system from said second user in response to said second prompting, second speech data comprising a second password/passphrase associated with said second user;
storing, by said computing system, said second speech data;
converting, by said computing system, said second speech data to second text data;
comparing, by said computing system, said second text data to said second existing text data to determine if said second password/passphrase matches said second existing password/passphrase, wherein said comparing said second text data to said second existing text data determines that said second password/passphrase does not match said second existing password/passphrase;
generating, by said computing system in response to said comparing said second text data to said second existing text data, an error message; and
transmitting, by said computing system, said error message to said second user.

20. The computing system of claim 19, wherein said method further comprises:
after said transmitting said error message to said second user, requesting by said computing system, that said second user re-enter a password/passphrase using speech;
receiving, by said computing system from said second user in response to said requesting, third speech data comprising a third password/passphrase associated with said second user;
storing, by said computing system, said third speech data;
converting, by said computing system, said third speech data to third text data;
comparing, by said computing system, said third text data to said second existing text data to determine if said third password/passphrase matches said second existing password/passphrase, wherein said comparing said third text data to said second existing text data determines that said third password/passphrase matches said second existing password/passphrase;
comparing, by said computing system, said third speech data with said second pre-recorded voice sample to determine if a frequency spectrum associated with said third speech data matches a frequency spectrum associated with said second pre-recorded voice sample;
generating, by said computing system based on second results of said comparing said third speech data to said second pre-recorded voice sample, a second message indicating said second results; and
transmitting, by said computing system to said second user, said second message.

21. The computing system of claim 13, wherein said comparing said first speech data to said first pre-recorded voice sample determines that said frequency spectrum associated with said first speech data does not match said frequency spectrum associated with said first pre-recorded voice sample, wherein said additionally comparing said first frequency to said second frequency determines that said first frequency matches said second frequency, and wherein said method further comprises:
after said additionally comparing said first frequency to said second frequency, generating by said computing system, a second message requesting that said first user submit an updated pre-recorded voice sample; and
transmitting, by said computing system to said first user, said second message.

22. The computing system of claim 13, wherein said comparing said first speech data to said first pre-recorded voice sample determines that said frequency spectrum associated with said first speech data does match said frequency spectrum associated with said first pre-recorded voice sample, and wherein said method further comprises:
second comparing, by said computing system, said first speech data to said first pre-recorded voice sample to determine if a predetermined frequency deviation is found between said frequency spectrum associated with said first speech data and said frequency spectrum associated with said first pre-recorded voice sample, wherein said second comparing determines that said predetermined frequency deviation is found between said frequency spectrum associated with said first speech data and said frequency spectrum associated with said first pre-recorded voice sample;
after said second comparing, generating by said computing system, a second message requesting that said first user submit an updated pre-recorded voice sample; and transmitting, by said computing system to said first user, said second message.

* * * * *